United States Patent
Nishino et al.

(10) Patent No.: US 10,404,929 B2
(45) Date of Patent: Sep. 3, 2019

(54) SIGNAL OUTPUT CIRCUIT, IMAGE SENSOR, AND IMAGING APPARATUS

(71) Applicant: FUJITSU LIMITED, Kawasaki-shi, Kanagawa (JP)

(72) Inventors: Hironori Nishino, Isehara (JP); Akira Sawada, Fujisawa (JP)

(73) Assignee: FUJITSU LIMITED, Kawasaki (JP)

( * ) Notice: Subject to any disclaimer, the term of this patent is extended or adjusted under 35 U.S.C. 154(b) by 18 days.

(21) Appl. No.: 15/685,399

(22) Filed: Aug. 24, 2017

(65) Prior Publication Data
US 2018/0077370 A1 Mar. 15, 2018

(30) Foreign Application Priority Data

Sep. 9, 2016 (JP) .................... 2016-176411

(51) Int. Cl.
| | | |
|---|---|---|
| H04N 5/357 | (2011.01) | |
| H04N 5/365 | (2011.01) | |
| H04N 5/33 | (2006.01) | |
| H04N 5/367 | (2011.01) | |
| H04N 5/3745 | (2011.01) | |
| H04N 5/376 | (2011.01) | |

(52) U.S. Cl.
CPC ............. *H04N 5/3653* (2013.01); *H04N 5/33* (2013.01); *H04N 5/357* (2013.01); *H04N 5/367* (2013.01); *H04N 5/3765* (2013.01); *H04N 5/37452* (2013.01)

(58) Field of Classification Search
None
See application file for complete search history.

(56) References Cited

U.S. PATENT DOCUMENTS

| | | | | |
|---|---|---|---|---|
| 6,982,403 B2 * | 1/2006 | Yang | ..................... | H04N 5/361 |
| | | | | 250/208.1 |
| 7,531,858 B2 * | 5/2009 | Lee | ................... | H01L 27/14603 |
| | | | | 257/292 |
| 8,797,434 B2 * | 8/2014 | Lee | ................... | H01L 27/14609 |
| | | | | 250/208.1 |

(Continued)

FOREIGN PATENT DOCUMENTS

| | | |
|---|---|---|
| JP | 2005-295346 A1 | 10/2005 |
| JP | 2009-141612 A1 | 6/2009 |
| JP | 2011-142558 A1 | 7/2011 |

*Primary Examiner* — Twyler L Haskins
*Assistant Examiner* — Wesley J Chiu
(74) *Attorney, Agent, or Firm* — Kratz, Quintos & Hanson, LLP

(57) ABSTRACT

A signal output circuit includes a transistor includes a source that is coupled to a light receiving element and a gate of which electric potential is fixed, a first switch circuit capable of fixing a potential of the source to a reference potential, a second switch circuit coupled to a drain of the transistor, a third switch circuit coupled to the drain, a first capacitor coupled to the drain via the second switch circuit and coupled to the drain via the third switch circuit, wherein a first voltage according to a first current flowing through the transistor via the second switch circuit occurs, and a second voltage according to a second current flowing through the transistor via the third switch circuit occurs, and an output circuit that outputs a first signal corresponding to the first voltage and a second signal corresponding to the second voltage.

15 Claims, 16 Drawing Sheets

(56) References Cited

U.S. PATENT DOCUMENTS

| | | | |
|---|---|---|---|
| 2008/0018763 A1* | 1/2008 | Sato | H04N 5/335 348/308 |
| 2009/0295453 A1* | 12/2009 | Nishino | H04N 5/341 327/337 |
| 2011/0006192 A1* | 1/2011 | Miyazawa | H01L 27/14609 250/208.1 |
| 2012/0050586 A1* | 3/2012 | Kanemitsu | H04N 5/357 348/246 |
| 2015/0129746 A1* | 5/2015 | Wyles | H04N 5/378 250/208.1 |
| 2017/0244921 A1* | 8/2017 | Velichko | H01L 27/14627 |

* cited by examiner

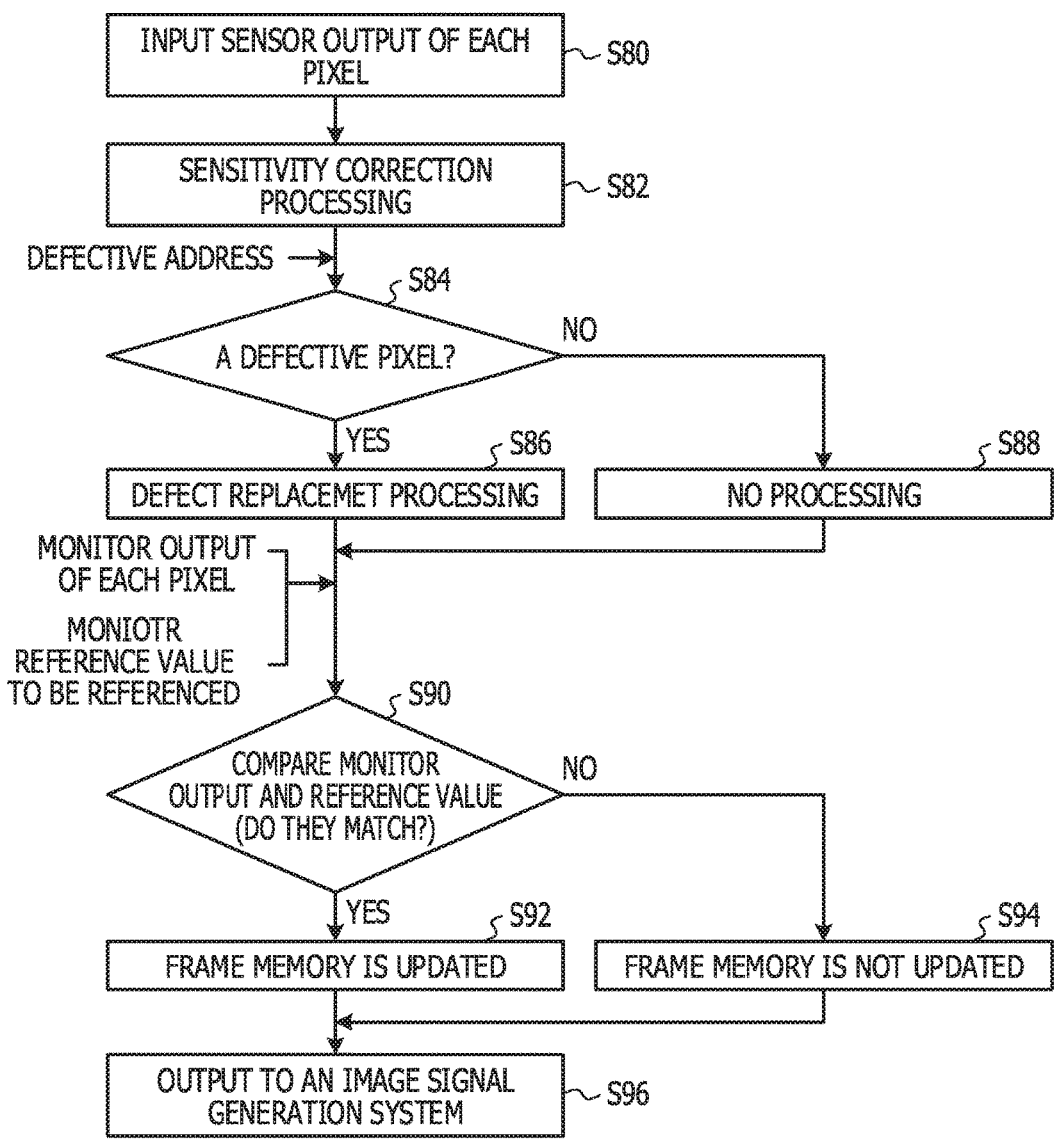

SIGNAL OUTPUT CIRCUIT, IMAGE SENSOR, AND IMAGING APPARATUS

CROSS-REFERENCE TO RELATED APPLICATION

This application is based upon and claims the benefit of priority of the prior Japanese Patent Application No. 2016-176411, filed on Sep. 9, 2016, the entire contents of which are incorporated herein by reference.

FIELD

The embodiments discussed herein are related to a signal output circuit, an image sensor, and an imaging apparatus.

BACKGROUND

An infrared imaging apparatus using an infrared image sensor is known as an imaging apparatus. An infrared imaging apparatus using an infrared image sensor has a characteristic of capable of measuring temperature contactless, and thus is used for applications, such as security, medical care, maintenance, research and development, military affairs, and the like. For example, an infrared imaging apparatus is used for contactless measuring the temperature of passengers at an airport and to extract patients of infectious diseases. Also, an infrared imaging apparatus is sometimes used for a night vision device. In the following, a description will be given of an example of an infrared imaging apparatus using an infrared imaging device. However, the described technique is not limited to this case.

FIG. 1 is a diagram illustrating an example of the configuration of an infrared imaging apparatus 1 using an infrared image sensor 14. The infrared imaging apparatus 1 includes an imaging unit 10 and a signal processing circuit 18 that performs signal processing on the infrared imaging signal output from the imaging unit 10. The imaging unit 10 includes a lens 11 and an infrared image sensor 14. The signal processing circuit 18 includes a sensitivity correction calculation circuit 16 and an imaging circuit 15.

FIG. 2 is a diagram illustrating an example of a configuration of the infrared image sensor 14. The infrared image sensor 14 detects the infrared light emitted from an observation object in accordance with the surface temperature of the observation object by a plurality of sensor elements disposed in a two-dimensional array. The infrared image sensor 14 then outputs a sensor output signal in order to generate a thermal image (thermographic image) indicating the distribution of the surface temperature of the observation object.

The infrared image sensor 14 includes a sensor array 12 and a complementary metal oxide semiconductor (CMOS) reading circuit 13. The CMOS reading circuit 13 is disposed on a substrate. The corresponding electrodes of the sensor array 12 and the CMOS reading circuit 13 are coupled by bumps 17 that are made of indium. The sensor array 12 includes a plurality of sensor elements (pixels) that are disposed in a two-dimensional array. Each sensor element of the sensor array 12 is a photoconductive element having a characteristic of changing the resistance value in accordance with the amount of incident infrared light.

The lens 11 (refer to FIG. 1) projects the infrared light emitted from the observation object onto the sensor array 12. Each sensor element of the sensor array 12 generates a photoelectric current in accordance with the amount of the incident infrared light that is projected. Thereby, the infrared light is converted to an electronic signal. The electronic signal is multiplexed by the CMOS reading circuit 13 and then is output to the sensitivity correction calculation circuit 16 of the signal processing circuit 18. The imaging circuit 15 performs format conversion on the infrared imaging signal after the sensitivity correction processing by the sensitivity correction calculation circuit 16 into an image signal for generating a thermal image. A display monitor not illustrated in FIG. 1 displays a thermal image based on the image signal output from the imaging circuit 15.

FIG. 3 is a diagram illustrating an example of a configuration of the CMOS reading circuit 13. The CMOS reading circuit 13 includes a plurality of pixel circuits 21 and a scan circuit 25.

The scan circuit 25 includes a plurality of scan lines 27 that extend in parallel in the horizontal direction (row direction), a plurality of vertical bus lines 28 that extend in parallel in the vertical direction (column direction), a vertical scanning shift register 22, and a horizontal scanning shift register 23.

The pixel circuits 21 are disposed in a matrix state correspondingly to the individual intersecting units of the plurality of scan lines 27 and the plurality of vertical bus lines 28. A sensor element 24 in a pixel circuit 21 indicates a sensor element (cell) disposed in the sensor array 12 (refer to FIG. 2), which is a photosensitive unit of the infrared image sensor 14. The pixel circuit 21 is disposed for each of the plurality of sensor elements 24.

In the pixel circuit 21, a reset signal RS is applied to a transistor 36 for a reset gate, and thus the transistor 36 becomes conductive so that a storage capacitor 41 is charged at a predetermined value. After the application of the reset signal RS is stopped, an integration signal IG-T2 is applied to a transistor 35 for an input gate for a certain period of time, a current corresponding to the infrared light intensity flows through the sensor element 24, and thus the voltage of the storage capacitor 41 becomes a voltage corresponding to the infrared light intensity. Next, a transistor 37 for sample-and-hold reset becomes conductive in response to a reset signal SHRS, and thus the voltage level of a sample-and-hold capacitor 42 is reset to a predetermined value. Next, sample-and-hold signals SH and /SH are applied to a transfer gate 38, and thus the voltage of the storage capacitor 41 is transferred to the sample-and-hold capacitor 42 and held. The sample-and-hold signal /SH is the inverted signal of the sample-and-hold signal SH. Such an operation is individually performed in the plurality of pixel circuits 21 at the same time, and thus a voltage corresponding to the infrared light intensity of each sensor element 24 is held in each sample-and-hold capacitor 42.

The vertical scanning shift register 22 outputs a scan pulse V-Sel that selects a plurality of scan lines 27 one by one in sequence. A transistor 32 whose gate is coupled to a scan line 27 to which the scan pulse V-Sel is output becomes conductive in accordance with the scan pulse V-Sel. The voltage held by the sample-and-hold capacitor 42 of the pixel circuit 21 coupled to the conductive transistor 32 via the transistor 31 is individually output to the corresponding vertical bus line 28 via the transistor 31 and the transistor 32.

The horizontal scanning shift register 23 applies a reading pulse H-Sel to a transistor 33 in sequence. In response to the reading pulse H-Sel, the voltage of the vertical bus line 28 is output to a reading line 26, and an image signal voltage Vpxl arises. The image signal voltage Vpxl is out from a final output stage amplifier 29 as an analog output signal Vout in sequence.

When the output of the voltage of all the vertical bus lines 28 is complete, the vertical scanning shift register 22 applies the scan pulse V-Sel to the next scan line 27. After that, the above-described operations are repeated, and the signals of all the sensor elements 24 that are two-dimensionally disposed are multiplexed and output on one output line. A transistor 34 becomes conductive in response to a signal VRS and resets the reading line 26 to a ground level.

A timing control signal that operates the CMOS reading circuit 13, such as the reset signal RS, or the like is given from the timing generator 20.

However, if there is a charge trap on the gate electrode interface of a CMOS transistor, the channel potential of the transistor gets out of order by the existence of an electron that comes in and out from the trap. FIG. 4 is a diagram illustrating a part of a configuration of the pixel circuit. When the channel potential of the transistor 35 for an input gate gets out of order due to a charge trap, even if the voltage given to the gate of the transistor 35 from the outside is kept as a fixed voltage, the gate-to-source voltage of the transistor 35 changes, and thus the source potential of the transistor 35 changes. Changes in the source potential of the transistor 35 cause fluctuations of the bias voltage applied to the both ends of the sensor element 24, which brings about fluctuations of the photoelectric current that occurs in the sensor element 24. Accordingly, the amount of charge stored in the storage capacitor 41 and transferred to the sample-and-hold capacitor 42 fluctuates. Accordingly, the pixel output voltage read from the pixel circuit 21 fluctuates with time in accordance with a temporal change of the trap state of the transistor 35 in the input gate unit.

The fluctuations of the pixel output voltage often appear as binary fluctuations having a relatively large amplitude as illustrated in FIG. 5, and are referred to as random telegraph noise. FIG. 5 is a diagram illustrating an example of fluctuations of a pixel output voltage. In FIG. 5, a pixel output voltage for a certain pixel circuit is expressed by continuous data that is arranged continuously on the time axis. If fluctuations of the pixel output voltage for a certain pixel continues as illustrated in FIG. 5, the luminance corresponding to the pixel changes on the display monitor with time, and thus an image on the display monitor might be disordered.

The following is a reference document.

[Document 1] Japanese Laid-open Patent Publication No. 2011-142558.

SUMMARY

According to an aspect of the invention, a signal output circuit includes a transistor includes a source that is coupled to a light receiving element and a gate of which electric potential is fixed, a first switch circuit capable of fixing a potential of the source to a reference potential, a second switch circuit coupled to a drain of the transistor, a third switch circuit coupled to the drain, a first capacitor coupled to the drain via the second switch circuit and coupled to the drain via the third switch circuit, wherein when the potential of the source is not fixed to the reference potential, a first voltage according to a first current flowing through the transistor via the second switch circuit occurs, and when the potential of the source is fixed to the reference potential, a second voltage according to a second current flowing through the transistor via the third switch circuit occurs, and an output circuit that outputs a first signal corresponding to the first voltage and a second signal corresponding to the second voltage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is a flowchart illustrating an example of the handling procedure of random telegraph noise;

DESCRIPTION OF EMBODIMENTS

Figure 6:
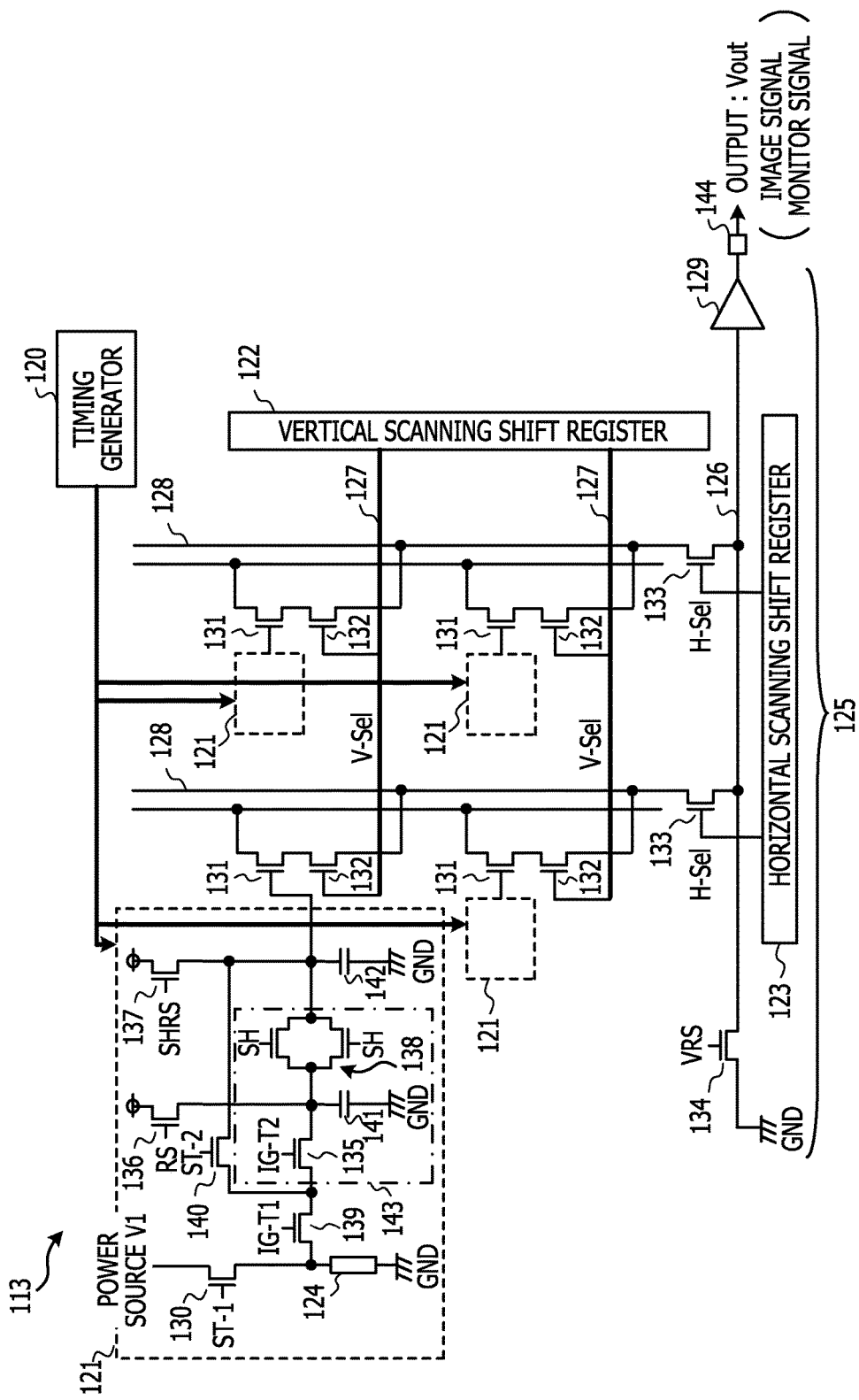
FIG. 6 is a diagram illustrating an example of the configuration of a CMOS reading circuit.

FIG. 6 is a diagram illustrating an example of the configuration of a CMOS reading circuit 113 according to an embodiment. The CMOS reading circuit 113 includes a plurality of pixel circuits 121 and a scan circuit 125. The CMOS reading circuit 113 is an example of the signal output circuit.

Figure 1:
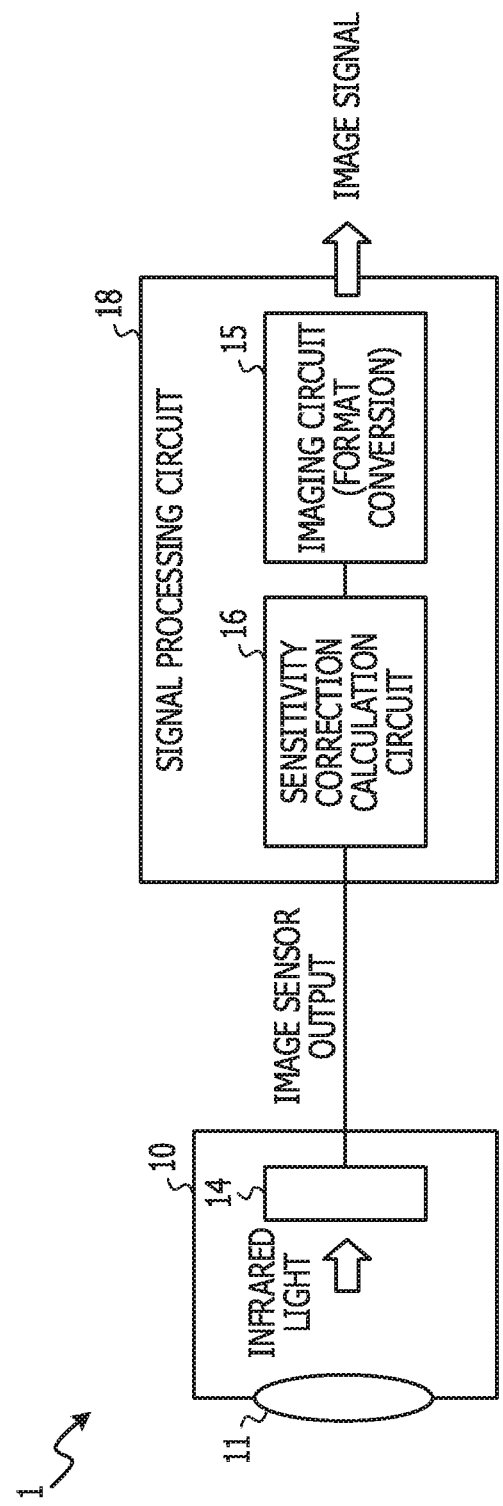
FIG. 1 is a diagram illustrating an example of the configuration of an infrared imaging apparatus using an infrared image sensor.
Figure 2:
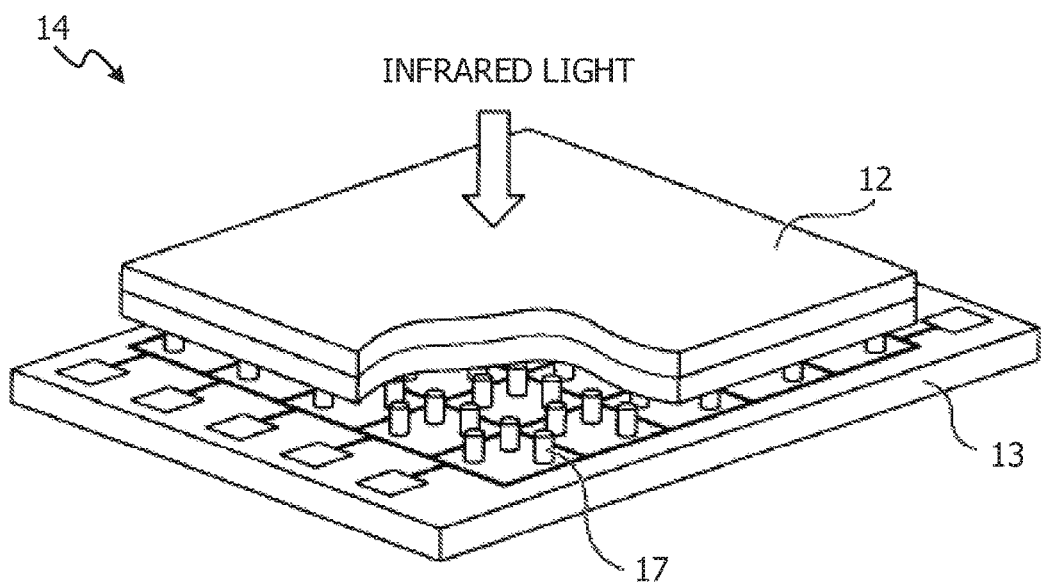
FIG. 2 is a diagram illustrating an example of the configuration of the infrared image sensor.
Figure 3:
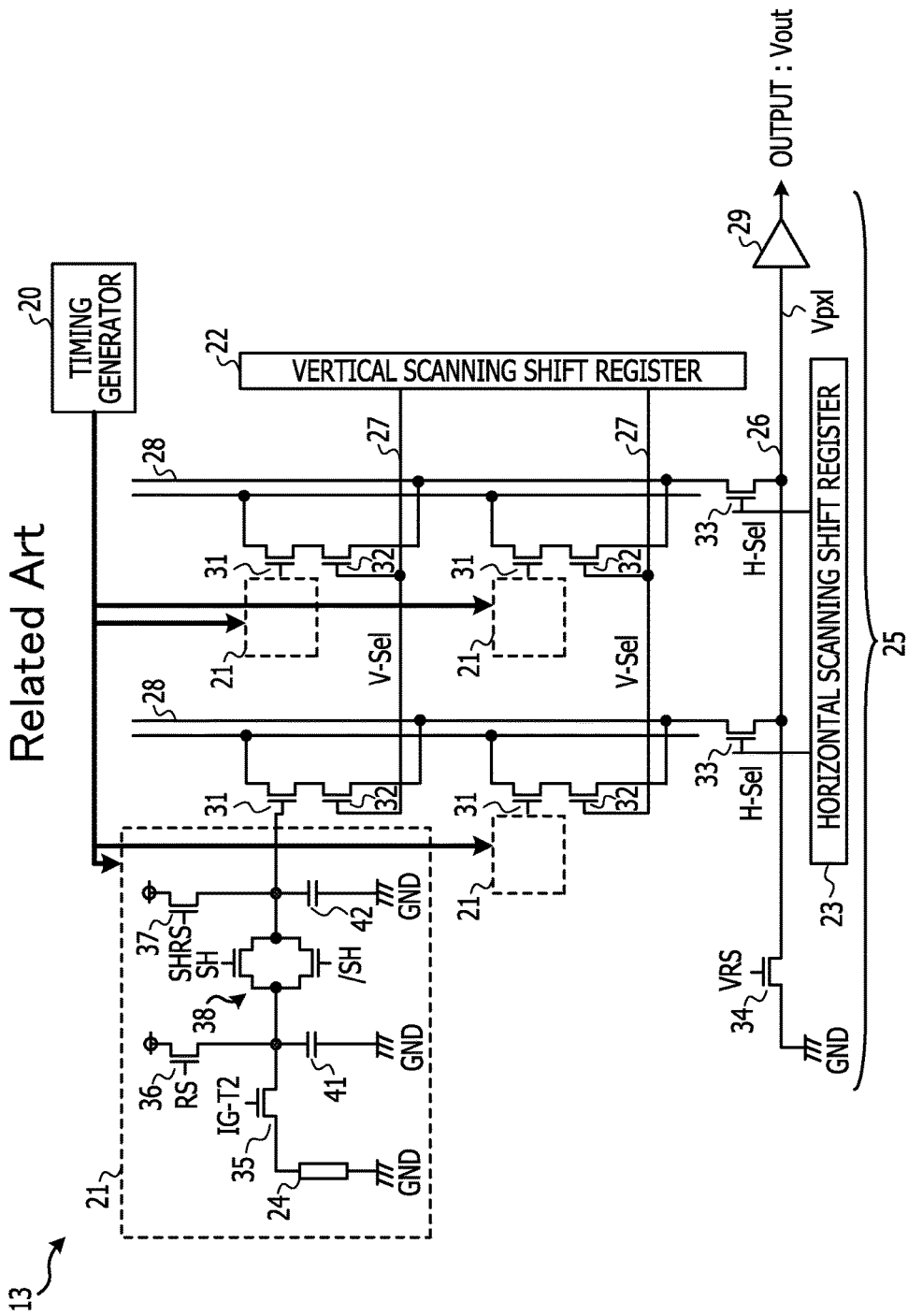
FIG. 3 is a diagram illustrating an example of the configuration of a CMOS reading circuit.
Figure 4:
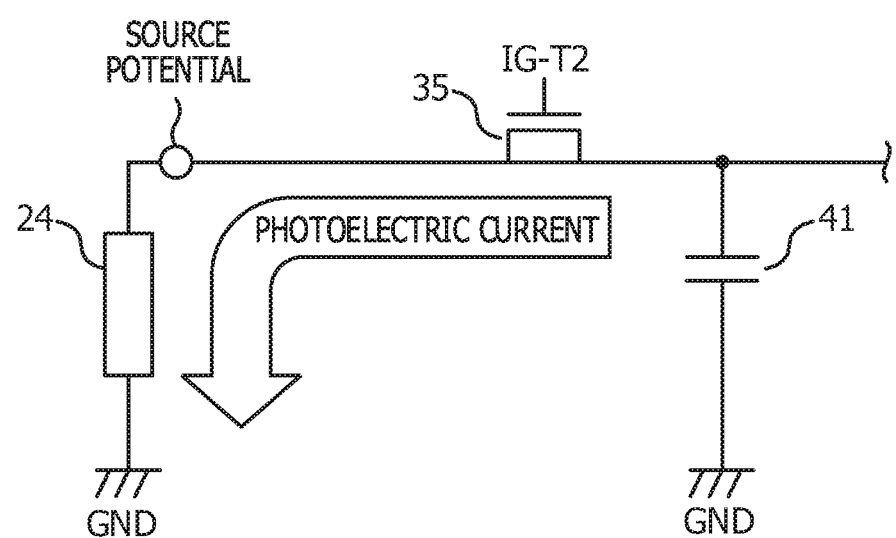
FIG. 4 is a diagram illustrating a part of the configuration of a pixel circuit.
Figure 5:
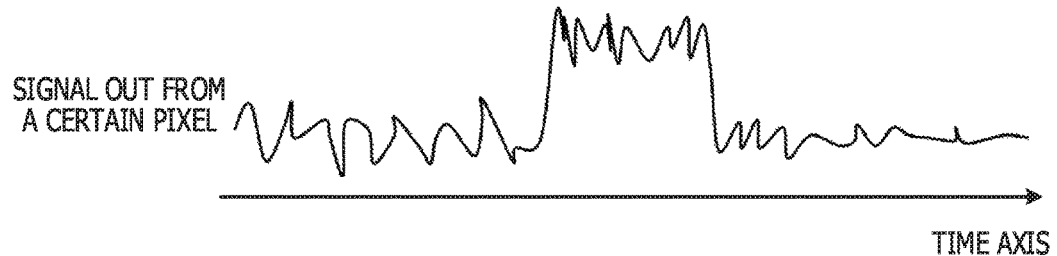
FIG. 5 is a diagram illustrating an example of fluctuations of a pixel output voltage.

The pixel circuits 121 are disposed in a matrix state correspondingly to the individual intersecting units of the plurality of scan lines 127 and the plurality of vertical bus lines 128. A sensor element 124 in the pixel circuit 121 illustrates a sensor element (cell) disposed in a sensor array in the same manner as the infrared image sensor 14 illustrated in FIG. 2. The pixel circuit 121 illustrated in FIG. 6 is disposed for each of the plurality of sensor elements 124. The sensor element 124 is a photoconductive element having a characteristic of changing the resistance value in accordance with the amount of incident infrared light. Each of the pixel circuits 121 has the same configuration with each other. The sensor element 124 is an example of the light receiving element.

The pixel circuit 121 includes a transistor 139, a transistor 130, a switch circuit 143, a transistor 140, a sample-and-hold capacitor 142, a transistor 136, and a transistor 137.

The transistor 130 is an example of the first switch unit. The switch circuit 143 is an example of the second switch unit. The transistor 140 is an example of the third switch unit. The sample-and-hold capacitor 142 is an example of the first capacitor.

The source of the transistor 139 is coupled to one end of the sensor element 124, and the potential gate of the transistor 139 is fixed. The other end of the sensor element 124 is coupled to ground (GND). The transistor 139 is, for example, an N-channel type metal oxide semiconductor (MOS) transistor.

The transistor 139 controls the bias voltage applied to the sensor element 124. A fixed gate drive signal IG-T1 is applied to the gate of the transistor 139. That is to say, the voltage applied to the both ends of the sensor element 124 by the transistors 139 is set to a fixed bias voltage.

The transistor 130 is an example of a mechanism capable of fixing the source potential of the transistor 139 at a reference potential (for example, the power source potential of a power source V1). The transistor 130 is disposed between one end of the source of the transistor 139 and the power source V1. One end, the drain, of the transistor 130 is coupled to the source of the transistor 139, and the other end, the source, of the transistor 130 is coupled to the power source V1. A gate drive signal ST-1 is applied to the gate of the transistor 130. The transistor 130 is opened and closed in accordance with the gate drive signal ST-1. The gate drive signal ST-1 is supplied from the timing generator 120. The transistor 130 is an example of the first switch unit and is, for example, an N-channel type MOS transistor.

The switch circuit 143 is coupled to the other end, the drain, of the transistor 139. The switch circuit 143 is an example of the second switch unit. The switch circuit 143 includes, for example, a transistor 135, a transfer gate 138, and a storage capacitor 141.

The transistor 135 is coupled to the transistor 139 in series, and one end of the transistor 135 is coupled to the drain of the transistor 139. The transistor 135 is an example of the first switch and is, for example, an N-channel type MOS transistor.

The transistor 135 controls a time period during which a current flows through the sensor element 124 and the transistor 139 (a time period during which charge is discharged from the storage capacitor 141). An integration signal IG-T2, which is a gate drive signal, is applied to the gate of the transistor 135. That is to say, the transistor 135 is set to be opened or closed in accordance with the integration signal IG-T2. When the transistor 135 becomes open, it is possible for a current to flow from the storage capacitor 141 to the sensor element 124 via the transistor 135 and the transistor 139, which are both in an open state. The integration signal IG-T2 is supplied from the timing generator 120.

The transfer gate 138 is an example of the sample-and-hold switch circuit disposed between the storage capacitor 141 and the sample-and-hold capacitor 142. One end of the transfer gate 138 is coupled to the other end of the transistor 135 and one end of the storage capacitor 141. The other end of the storage capacitor 141 is coupled to ground. The other end of the transfer gate 138 is coupled to one end of the sample-and-hold capacitor 142. The transfer gate 138 is an example of the second switch.

Sample-and-hold signals SH and /SH, which are gate drive signals, are applied to the respective gates of the transfer gate 138. The sample-and-hold signal /SH is the inverted signal of the sample-and-hold signal SH. The sample-and-hold signals SH and /SH are supplied from the timing generator 120.

The storage capacitor 141 is disposed between the transistor 135 and the transfer gate 138. The storage capacitor 141 is an example of the second capacitor. For example, one end of the storage capacitor 141 is coupled to a current path that connects the other end, the drain, of the transistor 135 and one end of the transfer gate 138, and the other end of the storage capacitor 141 is coupled to ground. An electrostatic capacitance element is given as a specific example of the storage capacitor 141.

The transistor 140 is coupled to the transistor 139 in series, and one end of the transistor 140 is coupled to the drain of the transistor 139. The other end of the transistor 140 is coupled to a current path between one end of the sample-and-hold capacitor 142 and one end of the transistor 137. The transistor 140 is an example of the third switch unit and is, for example, an N-channel type MOS transistor.

The transistor 140 controls a time period during which a current flows through the transistor 130 and the transistor 139 (a time period during which charge is discharged from the sample-and-hold capacitor 142). A monitor control signal ST-2, which is a gate drive signal, is applied to the gate of the transistor 140. That is to say, the transistor 140 is set to be opened or closed in accordance with the monitor control signal ST-2. When the transistor 140 is open, it is possible for a current to flow from the sample-and-hold capacitor 142 to the power source V1 via the transistor 139 and the transistor 130, which are both in an open state. The monitor control signal ST-2 is supplied from the timing generator 120.

The sample-and-hold capacitor 142 is coupled to one end of the storage capacitor 141 via the transfer gate 138. One end of the sample-and-hold capacitor 142 is coupled to a current path coupled to the other end of the transfer gate 138, and the other end of the sample-and-hold capacitor 142 is coupled to ground. An electrostatic capacitance element is given as a specific example of the sample-and-hold capacitor 142.

Next, a description will be given of an example of the operation of the pixel circuit 121.

The transistor 139 is kept on all the time by the fixed gate drive signal IG-T1.

When both of the transistors 130 and 140 are off by the ST-1 and the ST-2, respectively, a reset signal RS is applied the reset gate transistor 136, the transistor 136 becomes conductive, and the storage capacitor 141 is charged at a predetermined value. After the application of the reset signal RS is stopped, the integration signal IG-T2 is applied to the input gate transistor 135 for a certain period of time, a current corresponding to the infrared light intensity flows through the sensor element 124, and thus the voltage of the storage capacitor 141 becomes a voltage corresponding to the infrared light intensity. That is to say, the charge produced by integrating a photoelectric current corresponding to the intensity of the incident infrared light on the sensor element 124 during a period in which the transistor 135 is on is stored in the storage capacitor 141. Next, the transistor 137 for sample-and-hold reset becomes conductive in response to a reset signal SHRS, and thus the voltage level of the sample-and-hold capacitor 142 is reset to a predetermined value. Next, the sample-and-hold signals SH and /SH are applied to the transfer gate 138, and thus the voltage of the storage capacitor 141 is transferred to the sample-and-hold capacitor 142 and held.

Here, when the transistor 135 is turned off (closed) and the transistors 130 and 140 are turned on (open), the sample-and-hold capacitor 142 and the power source V1 are coupled by the current path via the transistor 140, the transistor 139, and the transistor 130. The voltage of the power source V1 is adjusted in advance such that a current (hereinafter also referred to as a "monitor current") that flows from the sample-and-hold capacitor 142 to the side of the power source V1 via the current path becomes about the same as the current that flows through the sensor element 124.

The capacitance value of the sample-and-hold capacitor 142 is set lower than the capacitance value of the storage capacitor 141 (for example, about 1/10). Accordingly, it is possible to generate a signal voltage about the same level of the signal voltage that occurs across the storage capacitor 141 in a period during which a photoelectric current is integrated across the sample-and-hold capacitor 142 in a shorter time (for example, a time period about 1/10 the time period) than a time period during which the photoelectric current is integrated by the storage capacitor 141.

In a state in which the transistors 130 and 140 are on, the source side of the transistor 139 is fixed at a certain potential given by the power source V1, and the gate side of the transistor 139 is fixed at a certain potential given by the gate drive signal IG-T1. Accordingly, the monitor current that flows between the gate and the drain of the transistor 139 in accordance with the gate-to-source characteristic of the transistor 139 is fixed to a certain current value.

However, even in a state in which the transistor 135 is off and the transistors 130 and 140 are on, if random telegraph noise occurs, the gate-to-source voltage of the transistor 135 changes. When the gate-to-source voltage of the transistor 135 changes, the current value of the monitor current that flows between the gate and the drain of the transistor 139 also changes. On the other hand, in a state in which the transistor 135 is off and the transistors 130 and 140 are on, the current supplied to the sensor element 124 is supplied not from the side of the transistor 139, but from the side of the power source V1. Accordingly, even if the current that flows through the sensor element 124 increases or decreases due to a change in the amount of the incident infrared light, the increase or the decrease is adjusted by the supply of the current from the power source V1.

That is to say, it is possible to regard a change in the current value of the monitor current in a state in which the transistor 135 is off and the transistors 130 and 140 are on as a change due to the amount of the incident infrared light, but as a change due to random telegraph noise. Accordingly, it becomes possible to determine whether or not random telegraph noise has occurred by monitoring whether or not there is a change in the current value of the monitor current in a state in which the transistor 135 is off and the transistors 130 and 140 are on.

Figure 7:
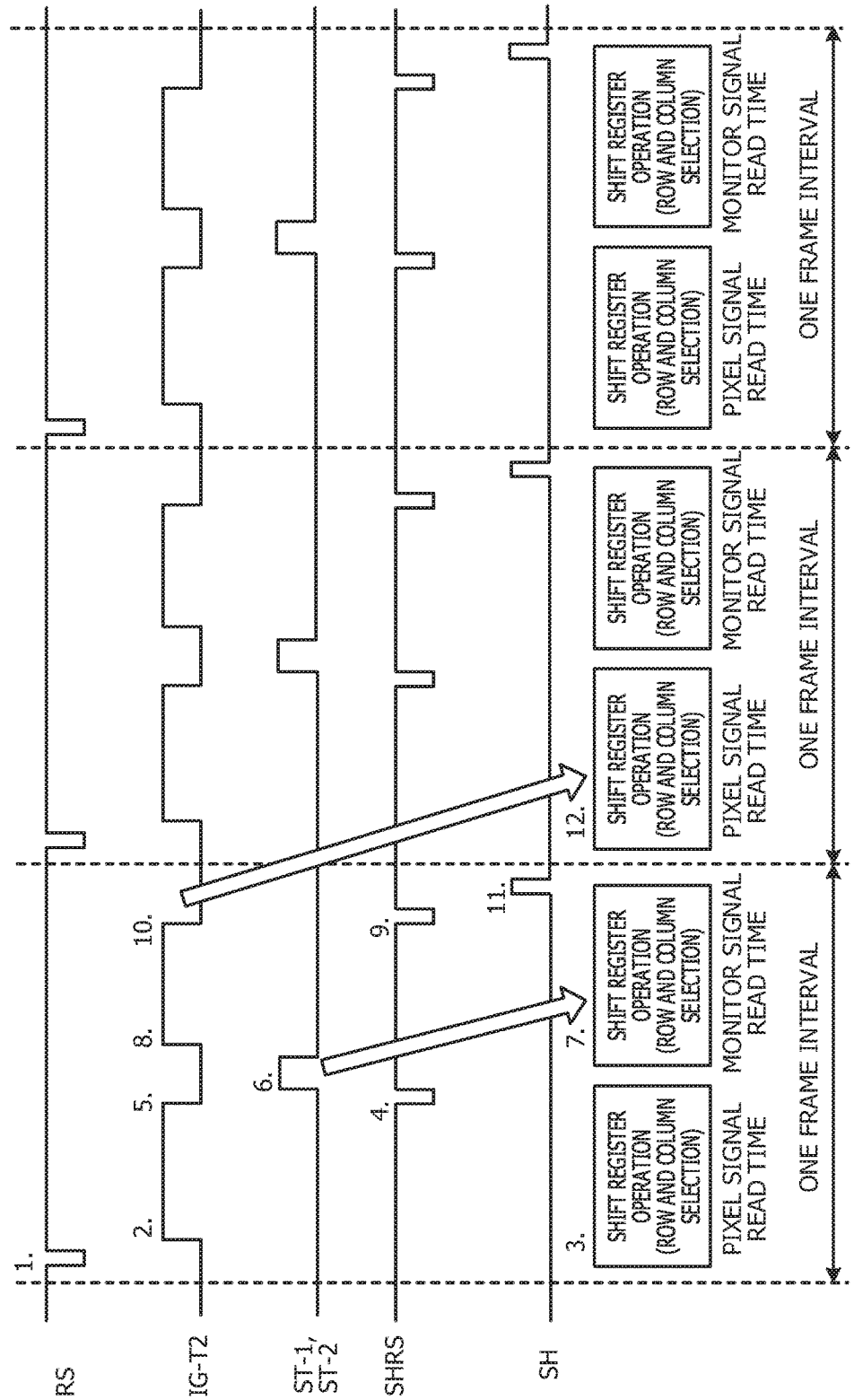
FIG. 7 is a timing chart illustrating an example of operation of the pixel circuit.

FIG. 7 is a timing chart illustrating an example of the operation of the pixel circuit 121. A description will be given of FIG. 7 below with reference to FIG. 6. The fixed gate drive signal IG-T1 is applied to the transistor 139 all the time so that the transistor 139 is kept on all the time and performs no pulse operation.

1. First, the reset signal RS is applied to the reset gate transistor 136, and thus the transistors 136 becomes conductive so that the storage capacitor 141 is charged with a predetermined value. The transistors 136 is a P-channel type MOS transistor, and thus becomes on (open) in a period during which the reset signal RS is at a low level.

2. After the application of the reset signal RS is stopped, the input gate transistor 135 is turned on in accordance with the integration signal IG-T2, the integration of the photoelectric current that flows through the transistor 135 and the transistor 139 is started.

3. In parallel with the integration operation, the scan circuit 125 reads in sequence each pixel signal corresponding to a photoelectric current integrated in the previous imaging frame from the sample-and-hold capacitor 142 using a vertical scanning shift register 122 and a horizontal scanning shift register 123.

4. After the completion of reading each pixel signal, the sample-and-hold reset transistor 137 becomes conductive in response to the reset signal SHRS, and thus resets the voltage level of the reset sample-and-hold capacitor 142 to a predetermined value. The transistor 137 is a P-channel type MOS transistor, and thus becomes on (open) while the reset signal SHRS is at a low level.

5. Also, after the completion of reading each pixel signal, the integration of the photoelectric current is temporarily suspended due to the turning off of the transistor 135 with the reset of the sample-and-hold capacitor 142.

6. Next, the transistors 130 and 140 become on by ST-1 and ST-2, respectively. In a state in which the source of the transistor 139 is coupled to the power source V1 via the transistor 130, the charge produced by integrating the monitor current is stored in the sample-and-hold capacitor 142, and thus the monitor signal voltage (monitor output voltage) occurs across the sample-and-hold capacitor 142. As described above, it is possible to perform integration of the monitor current in a shorter period compared with the integration of the photoelectric current.

7. When the integration of the monitor current is completed, the transistors 130 and 140 are turned off by ST-1 and ST-2, respectively. The scan circuit 125 reads a monitor signal corresponding to each monitor current integrated in the imaging frame of this time from the sample-and-hold capacitor 142 in sequence by the vertical scanning shift register 122 and the horizontal scanning shift register 123.

8. At the same time with reading the monitor signal, the input gate transistor 135 is turned on in accordance with the integration signal IG-T2, and the integration of the photoelectric current that flows through the transistor 135 and the transistor 139 is started again.

9. After the completion of reading each monitor signal, the sample-and-hold reset transistors 137 becomes conductive again in response to the common reset signal SHRS and thus resets again the voltage level of the reset sample-and-hold capacitor 142 to a predetermined value.

10. Also, after the completion of reading each monitor signal, the integration of the photoelectric current is stopped due to the turning off of the transistor 135 with the reset of the sample-and-hold capacitor 142.

11. After the sample-and-hold capacitor 142 is reset, the transfer gate 138 is turned on by the sample-and-hold signals SH and /SH, and thereby the voltage of the storage capacitor 141 is transferred to the sample-and-hold capacitor 142. Thereby, a signal voltage (pixel output voltage) obtained by the integration of the photoelectric current occurs across the sample-and-hold capacitor 142.

12. The scan circuit 125 reads in sequence a pixel signal corresponding to each integrated photoelectric current from the sample-and-hold capacitor 142 using the vertical scanning shift register 122 and the horizontal scanning shift register 123.

By such an operation, when the source potential of the transistor 139 is not fixed to the reference potential, a pixel output voltage in accordance with the photoelectric current that flows through the transistor 139 via the transistor 135 occurs across the sample-and-hold capacitor 142. Also, when the source potential of the transistor 139 is fixed to the reference potential transistor 139, the monitor output voltage in accordance with the monitor current that flows through the transistor 139 via the transistor 140 occurs across the sample-and-hold capacitor 142.

In this regard, a photoelectric current is an example of the first current, and a pixel output voltage is an example of the first voltage. A monitor current is an example of the second current, and a monitor output voltage is an example of the second voltage.

Also, in this manner, the pixel circuit is controlled such that a photoelectric current and a monitor current alternately flow during the same imaging frame period. Accordingly, in addition to a pixel signal, which is the source of generating an image signal, it is possible to obtain a monitor signal generated during the period of suspending the integration of the photoelectric current as an output signal of the scan circuit 125 in the same imaging frame period.

It is possible to determine that random telegraph noise has occurred in the imaging frame in a pixel whose monitor signal has changed. Accordingly, for example, an external signal processing circuit of the CMOS reading circuit 113 performs suitable processing, such as processing for not using a pixel signal corresponding to a pixel from which a change in the monitor signal has been detected or a signal obtained from the pixel signal in order to generate an image signal, or the like. By performing such processing, it becomes possible to obtain an image signal from which the influence of random telegraph noise is excluded.

Next, a description will be given of the scan circuit 125.

In FIG. 6, the scan circuit 125 includes a plurality of scan lines 127 that extend in parallel in the horizontal direction (row direction), and a plurality of vertical bus lines 128 that extend in parallel in the vertical direction (column direction), a vertical scanning shift register 122, and a horizontal scanning shift register 123. Also, the scan circuit 125 includes an amplification transistor 131 and a row selection transistor 132 for each of the plurality of pixel circuits 121. Also, the scan circuit 125 includes a plurality of column selection transistors 133, a reading line 126, an output stage amplifier 129, and a transistor 134.

The scan circuit 125 is an example of the output unit. The scan circuit 125 outputs a pixel signal corresponding to a pixel output voltage that has occurred across the sample-and-hold capacitor 142 and a monitor signal corresponding to a monitor output voltage that has occurred across the sample-and-hold capacitor 142 in time series from a common output terminal 144 as an output signal Vout. A pixel signal is an example of the first signal, and a monitor signal is an example of the second signal.

The pixel signal and the monitor signal are output from the common output terminal 144 so that the signal wiring lines coupled to an output terminal are reduced compared with the case in which a pixel signal and a monitor signal are output from separate output terminals. Accordingly, it becomes possible to reduce an area demanded for signal wiring lines.

Figure 8:
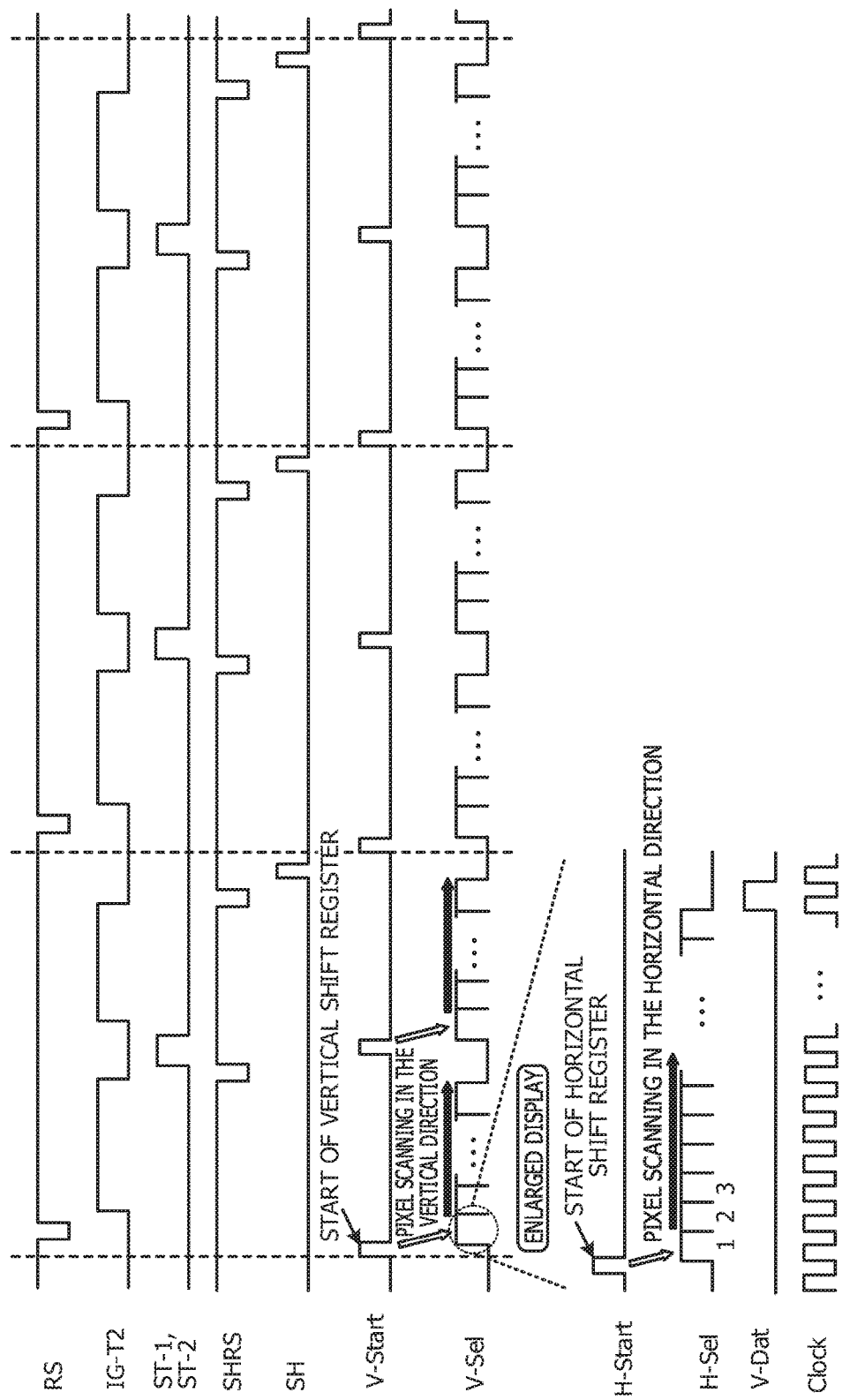
FIG. 8 is a timing chart illustrating an example of operation of a scan circuit.

FIG. 8 is a timing chart illustrating an example of the operation of the scan circuit 125. A description will be given of FIG. 8 with reference to FIG. 6.

The signal voltages (the pixel output voltage and monitor output voltage) of each pixel, which have been transferred to the sample-and-hold capacitors 142, are read in time series by changing the switches of the matrix by the shift registers. The operation of the shift register is as follows.

The scanning by the vertical scanning shift register 122 is started by a pulse signal V-Start, and the scanning by the horizontal scanning shift register 123 is started by a pulse signal H-Start. While the row selection transistors 132 in the first row is turned on by a scan pulse V-Sel with the first selection by the vertical scanning shift register 122, the horizontal scanning shift register 123 counts up in sequence in response to a clock signal (Clock). Thereby, the column selection transistors 133 disposed in each column is selected by the reading pulse H-Sel of the horizontal scanning shift register 123 such that the first column, the second column, and the third column are changed to on in sequence. The pixel selection is then performed by the horizontal scanning shift register 123 from the beginning column to the last column in the first row. After the last column in the first row is selected, the level of the rearmost selection signal V-Dat of the horizontal scanning shift register 123 becomes an active level.

By the rearmost selection signal V-Dat becoming the active level, the vertical scanning shift register 122 is caused to count up by one, and thus the vertical scanning shift register 122 changes to select the next second row. The pulse signal H-Start is given to the horizontal scanning shift register 123 again. While the row selection transistor 132 in the second row is turned on by a scan pulse V-Sel with the selection by the vertical scanning shift register 122, the horizontal scanning shift register 123 counts up in sequence in response to a clock signal (Clock). Thereby, the column selection transistors 133 disposed in each column is selected by the reading pulse H-Sel of the horizontal scanning shift register 123 such that the first column, the second column, and the third column are changed to on in sequence. The pixel selection is then performed by the horizontal scanning shift register 123 from the beginning column to the last column in the second row. After the last column in the second row is selected, the level of the rearmost selection signal V-Dat of the horizontal scanning shift register 123 becomes the active level. This processing is repeated until the selection of the last row.

Such shift register operations are repeated, and thus the scanning of the pixel selection is carried out in the vertical direction and the horizontal direction. Thereby the outputs of all the pixels are read in sequence. That is to say, the pixel signal and the monitor signal are output from the reading circuit 113 in time series as the output signal Vout. The transistor 134 becomes conductive in response to the signal VRS supplied from the timing generator 120 and resets the reading line 126 to the ground level.

The timing control signal that operates the CMOS reading circuit 113, such as a reset signal RS, or the like is given from the timing generator 120. The timing generator 120 is disposed inside the reading circuit 113 or outside (for example, in a signal processing circuit 118 described later) the reading circuit 113.

Figure 9:
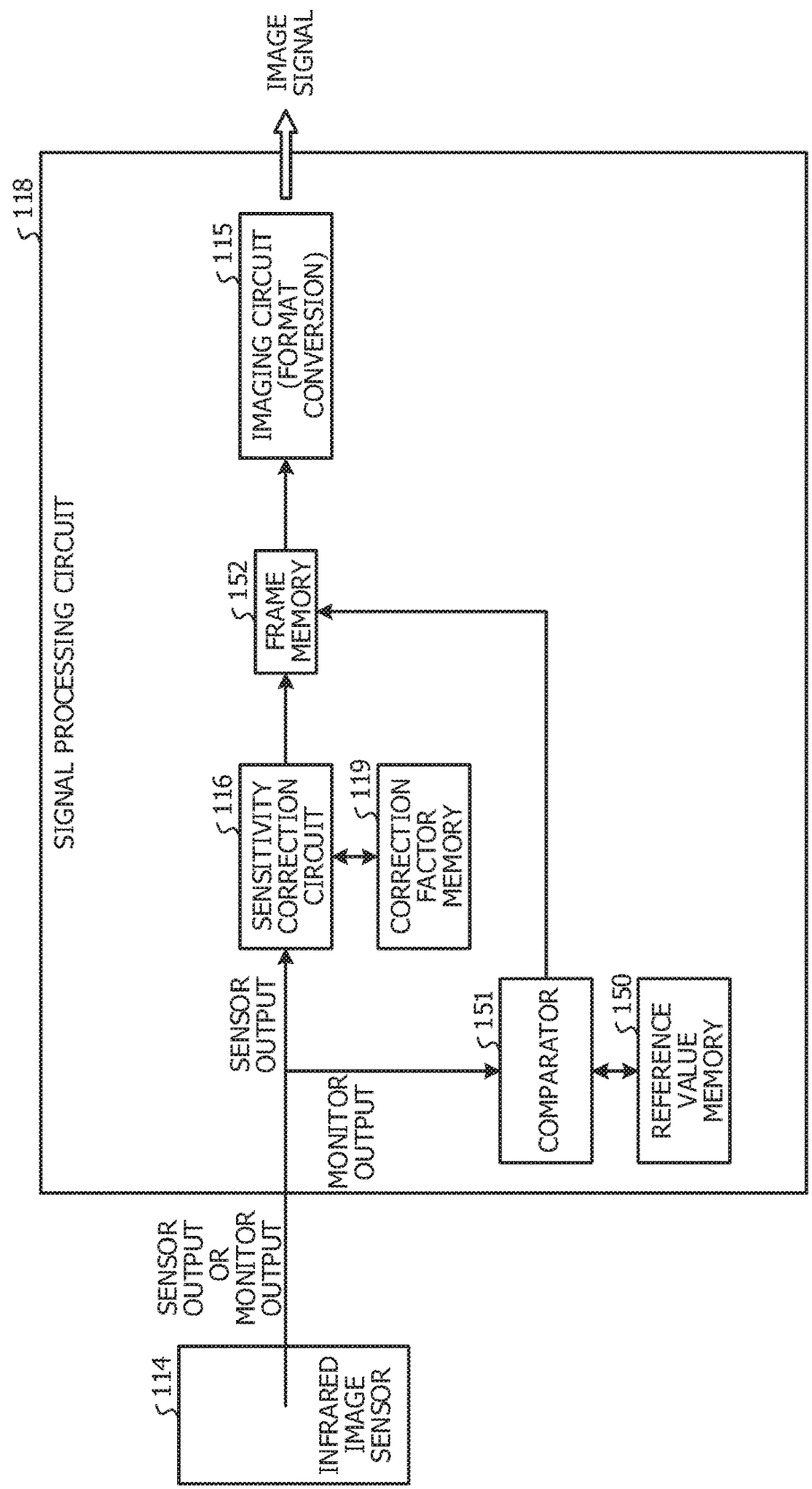
FIG. 9 is a diagram illustrating an example of the configuration of a signal processing unit.

FIG. 9 is a diagram illustrating an example of the configuration of the signal processing circuit 118. The signal processing circuit 118 is an example of the signal processing unit. The signal processing circuit 118 generates an image signal for generating a thermal image displayed on the display monitor based on the sensor output obtained from the pixel signal output from the internal reading circuit 113 of the infrared image sensor 114. The sensor output is an example of the first output signal, and is a signal, for example, that is a digital signal obtained by converting an analog pixel signal.

The signal processing circuit 118 includes a sensitivity correction circuit 116 that corrects sensitivity variations of each pixel (each pixel circuit 121) and a memory 119 that stores a correction factor for correcting the sensitivity variations of each pixel (each pixel circuit 121). The memory 119 stores a correction factor for correcting the sensor output for each sensor element 124.

The sensitivity of each pixel of the infrared image sensor 114 varies by the influence of the difference in the photo responsive characteristic of the sensor element 124, and the fluctuations of the drive bias to the sensor element 124 due to the characteristic difference of the transistors 139, and the like. In order to correct the sensitivity variations of each pixel, the sensitivity correction circuits 116 performs processing for multiplying the sensor output read in time series by a sensitivity correction factor for each one pixel. The gain value corresponding to the offset value to be reference for each pixel and the photo responsive sensitivity of each pixel are stored in the memory 119 as a correction factor. The sensitivity correction circuit 116 performs the correction calculation processing such that the same output (sensitivity) is obtained from each pixel with respect to uniform incident light using the correction factor read from the memory 119.

Also, the signal processing circuit 118 includes a comparator 151, a reference value memory 150, a frame memory 152, and an imaging circuit 115.

The comparator 151 compares a monitor output for each pixel and a reference value for each pixel regarding the same pixel. The monitor output is obtained from the monitor signal output from the reading circuit 113 in the infrared image sensor 114. A monitor output is an example of the second output signal and is, for example, a signal produced by converting an analog monitor signal to a digital signal. The reference value for each pixel is stored in the reference value memory 150 in advance.

The frame memory 152 stores the sensor output after the sensitivity correction by the sensitivity correction circuit 116 in accordance with a comparison result of the comparator 151 as pixel output data. The imaging circuit 115 performs format conversion on the pixel output data that has been read from the frame memory 152 to an image signal for generating a thermal image. The imaging circuit 115 outputs the image signal to the display monitor.

Figure 10:
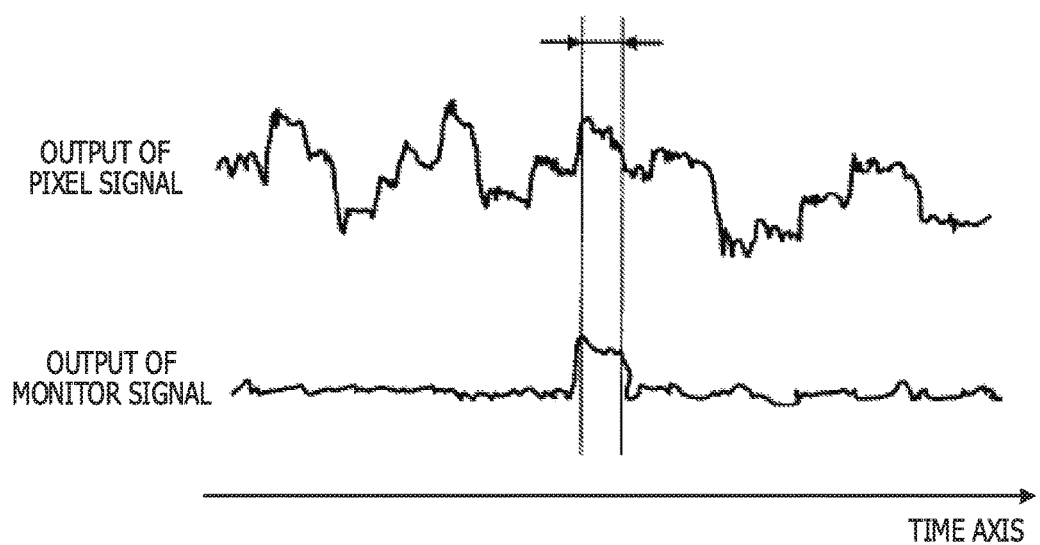
FIG. 10 is a diagram illustrating an example of changes of two output signals.

FIG. 10 is a diagram illustrating an example of a change in the pixel signal and the monitor signal. On the pixel signal output from the reading circuit 113, various signal levels occur in accordance with a change in the amount of incident waves onto the sensor element 124. Accordingly, it is difficult to determine random telegraph noise only from an image signal. However, as described above, the monitor signal output from the reading circuit 113 is fixed regardless of a change in the amount of incident waves onto the sensor element 124 unless random telegraph noise has occurred. Accordingly, if the monitor signal continuously fluctuates, it is possible to consider that random telegraph noise has occurred.

Thus, the signal processing circuit 118 illustrated in FIG. 9 determines the occurrence of random telegraph noise in the transistor 139 based on a change in the monitor output obtained from the monitor signal. For example, it is possible for the signal processing circuit 118 to determine the occurrence of random telegraph noise in the transistor 139 by the comparator 151 comparing the monitor output with the reference value stored in the reference value memory 150 in advance.

That is to say, it is possible for the signal processing circuit 118 to determine whether the fluctuations of the pixel signal output or the sensor output from the infrared image sensor 114 are due to a change in the incident waves, such as the incident infrared light on the sensor element 124 or due to noise, such as random telegraph noise.

For example, if the comparator 151 detects that the difference between the monitor output and the reference value is smaller than or equal to a predetermined value, the signal processing circuit 118 determines that random telegraph noise has not occurred. On the other hand, if the comparator 151 detects that the difference between the monitor output and the reference value is larger than the predetermined value, the signal processing circuit 118 determines that random telegraph noise has occurred.

If the signal processing circuit 118 determines that random telegraph noise has not occurred, the signal processing circuit 118 uses the sensor output after the sensitivity correction for generating an image signal. For example, the signal processing circuit 118 records the sensor output after the sensitivity correction in the frame memory 152 as pixel output data, and then transmits the pixel output data read from the frame memory 152 to the imaging circuit 115. The pixel output data in the previous imaging frame has been stored in the frame memory 152, and thus the signal processing circuit 118 updates the pixel output data in the previous imaging frame to the image output data in this time imaging frame.

On the other hand, if the signal processing circuit 118 determines that random telegraph noise has occurred, the signal processing circuit 118 does not use the sensor output after the sensitivity correction for generating an image signal. For example, if the signal processing circuit 118 determines that random telegraph noise has occurred, the signal processing circuit 118 does not update the pixel output data in the frame memory 152. Thereby, an image signal generated based on the pixel output data having no random telegraph noise is output from the imaging circuit 115. If determined that random telegraph noise has occurred, for example, the imaging circuit 115 generates an image signal based on the image output data stored in the frame memory 152 before the noise occurred.

Accordingly, with the present embodiment, a sensor output after the sensitivity correction of a pixel having the occurrence of random telegraph noise is not used for generating an image signal, and a sensor output after the sensitivity correction of a pixel having not the occurrence of random telegraph noise is used for generating an image signal. Thereby, it is possible to reduce conspicuous disturbance of an image, such as a luminance change, or the like due to noise, such as random telegraph noise.

Next, a description will be given of a specific example of an imaging apparatus.

Figure 11:
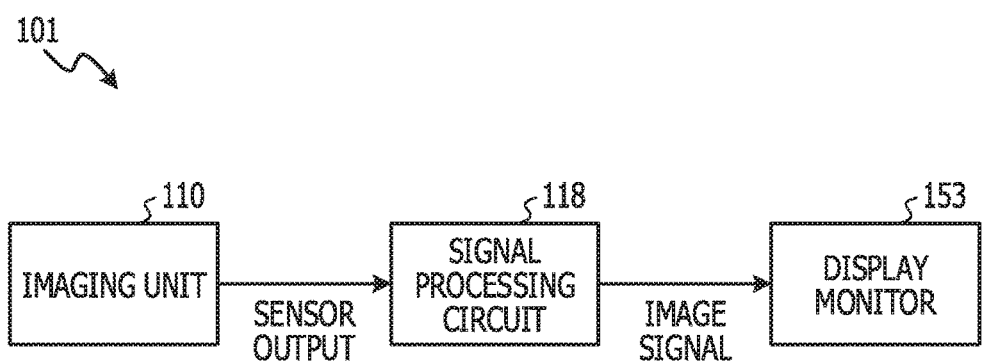
FIG. 11 is a diagram illustrating an example of the configuration of an infrared imaging apparatus.

FIG. 11 is a diagram illustrating an example of the configuration of an infrared imaging apparatus 101. The infrared imaging apparatus 101 includes an imaging unit 110, a signal processing circuit 118, and a display monitor 153. The infrared imaging apparatus 101 may or may not include the display monitor 153.

Figure 12:
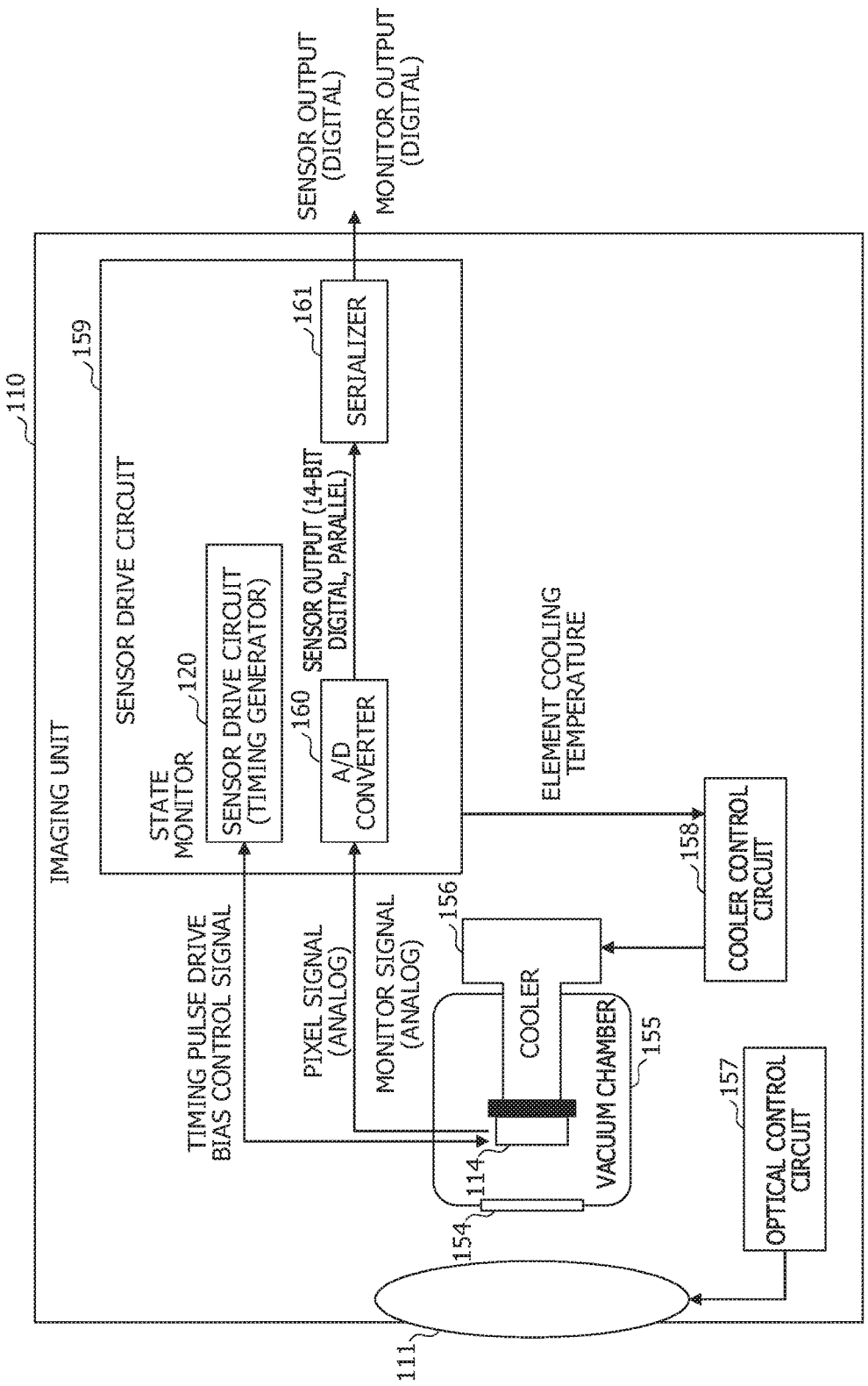
FIG. 12 is a diagram illustrating an example of the configuration of an imaging unit including an infrared image sensor.

FIG. 12 is a diagram illustrating an example of the configuration of an imaging unit 110 including the infrared image sensor 114. The infrared image sensor 114 includes a flip-chip bonded light receiving element array chip on the chip of the CMOS reading circuit 113 (refer to FIG. 6). The light receiving element array chip is a sensor array in which quantum well infrared photodetectors (QWIPs) are arranged in a two-dimensional array.

The infrared image sensor 114 is enclosed in a vacuum chamber 155. A cooler 156 cools the infrared image sensor 114 at 70 to 80K. An infrared light incident window 154 is attached to the tip of the vacuum chamber 155. The infrared light of an image formed by an optical system including a lens 111 disposed in front of the vacuum chamber 155 enters on the infrared image sensor 114 via the incident window 154. The focus position at which the lens 111 forms an image is adjusted to the incident surface of the infrared image sensor 114.

The imaging unit 110 includes a cooler control circuit 158 that keeps the cooling temperature of the infrared image sensor 114 at a fixed temperature and an optical control circuit 157 for performing focus adjustment of the lens 111.

The imaging unit 110 includes a sensor drive circuit 159 for driving the infrared image sensor 114. The sensor drive circuit 159 includes a timing generator 120 that supplies timing pulse signals (for example, a clock signal, a frame synchronization signal, a shift register control signal, and the like) to the CMOS reading circuit 113 of the infrared image sensor 114. The sensor drive circuit 159 supplies the operation power source of the CMOS reading circuit 113, the power source voltage of the internal amplifier of the CMOS reading circuit 113, the reset voltage, the bias voltages of the gate drive signal IG-T1, and the like to the CMOS reading circuit 113 of the infrared image sensor 114.

The sensor drive circuit 159 includes an analog-to-digital (A/D) converter 160. The A/D converter 160 converts the analog pixel signal and the monitor signal from the CMOS reading circuit 113 into, for example, a 14-bit parallel digital output. The 14-line parallel digital output is converted by a serializer 161 into a time-series digital signal in one system, and the converted digital signal is output to the outside as the sensor output or the monitor output. The sensor drive circuit 159 is an example of the output circuit.

In this regard, in FIG. 12, the configuration of the A/D converter 160 and the subsequent stage is illustrated by one output system. However, when the pixels in the two-dimensional array are read by dividing the array into a plurality of areas, there is a plurality of output channels from the CMOS reading circuit 113, and thus the number of A/D converters may be increased in accordance with the number of channels.

Figure 13:
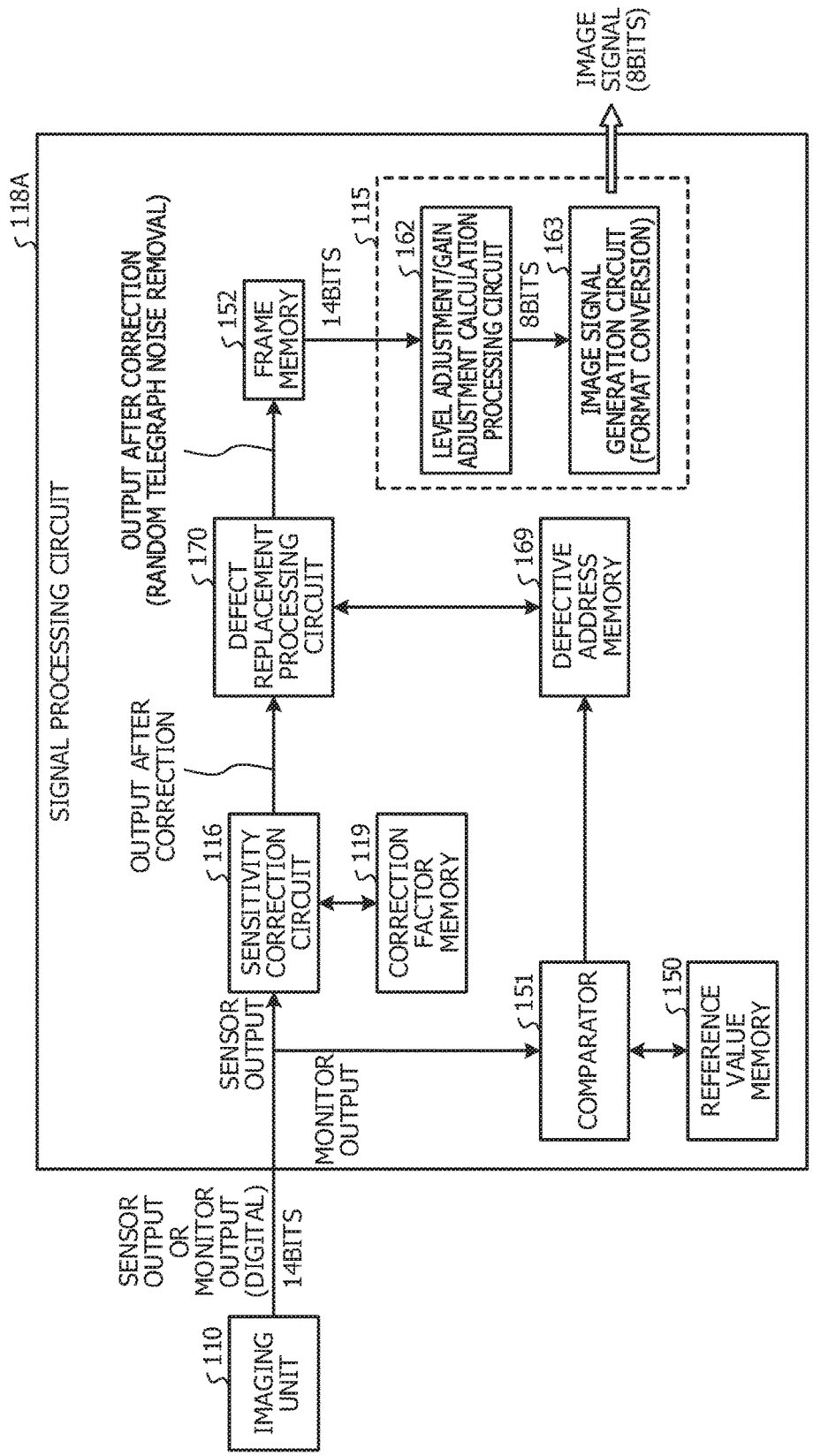
FIG. 13 is a diagram illustrating an example of the configuration of a signal processing unit.

FIG. 13 is a diagram illustrating an example of the configuration of a signal processing circuit 118A. The signal processing circuit 118A is the first example of the signal processing circuit 118. The signal processing circuit 118A performs signal processing on the output signal of the imaging unit 110.

The sensor output, which is output from the infrared image sensor 114 in time series, has photo responsive sensitivity variations. The sensitivity correction circuits 116 correct the sensitivity variations. The sensitivity correction circuits 116 multiply the sensor output by a correction factor stored in the memory 119 such that the individual sensor outputs with reference to a fixed amount of incident light to the sensor element 124 become the same with each other. The memory 119 stores the correction factor by which the sensor output is multiplied for each sensor element 124.

The sensor output after the sensitivity correction is sent to the frame memory 152 as the original data for generating an image signal. However, when the defect replacement processing circuit 170 records the sensor output after the sensitivity correction in the frame memory 152, the defect replacement processing circuit 170 performs processing for replacing a sensor output corresponding to a defective pixel with another data (for example, the processing for replacing with a sensor output corresponding to a normal pixel adjacent to a defective pixel). The defect replacement processing circuit 170 determines whether or not each pixel is a defective pixel by referring to the information recorded in a defective address memory 169 in advance.

Figure 14:
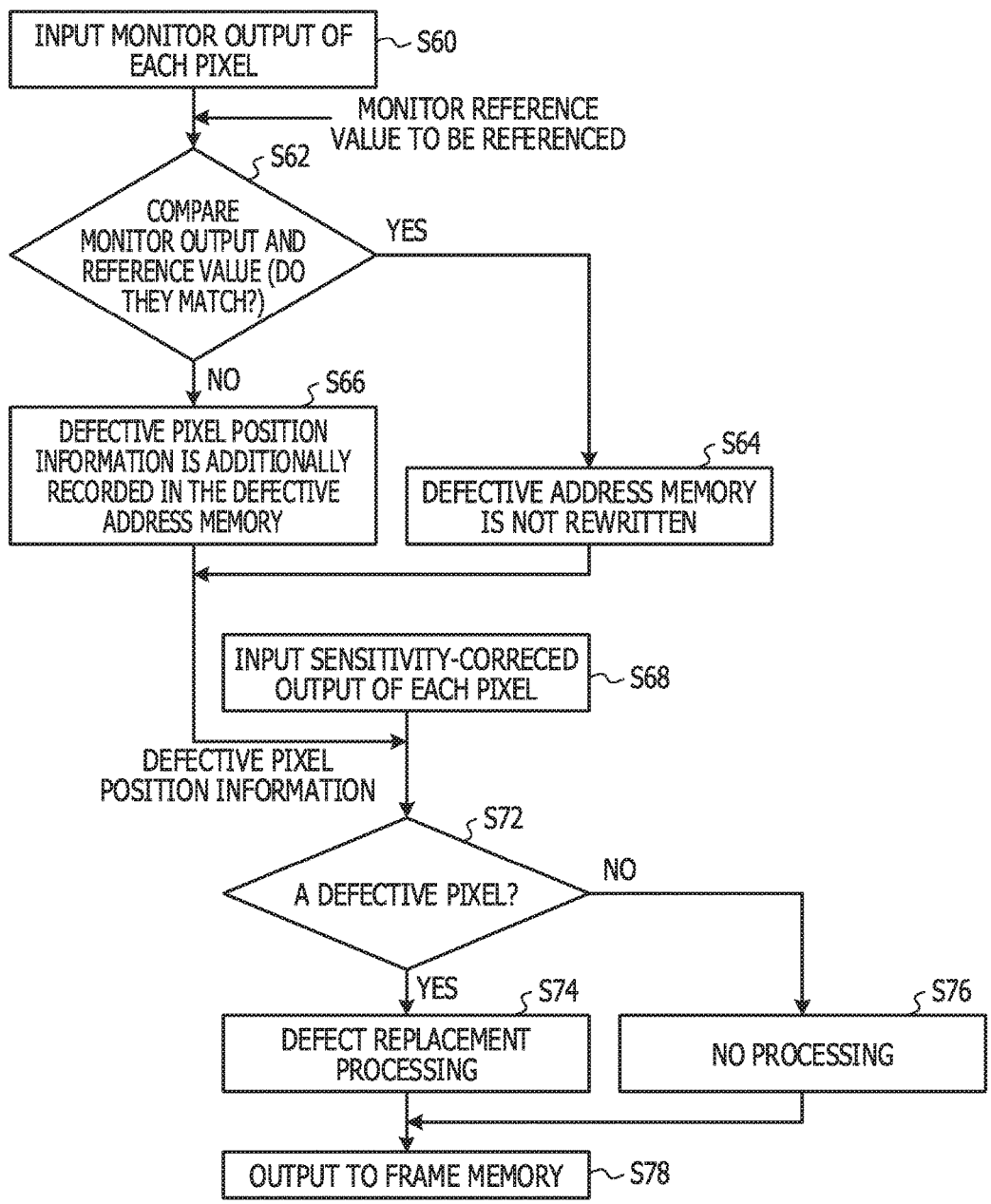
FIG. 14 is a flowchart illustrating an example of the handling procedure of random telegraph noise.

FIG. 14 is a flowchart illustrating an example of the handling procedure of random telegraph noise by the signal processing circuit 118A. A description will be given of the configuration in FIG. 13 in comparison with each processing step illustrated in FIG. 14.

The imaging unit 110 outputs the monitor output of each pixel to the comparator 151 (step S60). The comparator 151 compares the monitor output and the reference value recorded in the reference value memory 150 for a pixel having the same position with each other and determines whether or not they match each other (step S62). A reference value is, for example, an average value of the monitor output in a normal state.

If determined that the monitor output and the reference value do not match from the comparison result by the comparator 151, the comparator 151 determines that a pixel (sensor element 124) whose monitor output and the reference value do not match is defective. The comparator 151 additionally records the position information of the pixel determined as defective in the defective address memory 169 (step S66).

The additional registration processing is dynamically carried out for each one imaging frame. The monitor output is read from the imaging unit 110 earlier in one imaging frame period. Thus the additional registration in the defective address memory 169 is carried out in advance, and then the defect replacement processing is performed on the sensor output with reference to the updated defective address memory 169. Accordingly, if random telegraph noise occurs, the processing for excluding the noise is automatically performed simultaneously all the time.

On the other hand, if determined that the monitor output and the reference value match each other from the comparison result by the comparator 151, the comparator 151 determines that there are no defective pixels. If determined that there are no defective pixels, the comparator 151 does not rewrite the defective address memory 169 (step S64).

On the other hand, in step S68, the sensitivity correction circuit 116 outputs the sensor output after the sensitivity correction to the defect replacement processing circuit 170.

The defect replacement processing circuit 170 determines whether or not the position information of the pixel whose sensor output after the sensitivity correction has been obtained from the sensitivity correction circuit 116 is included in the position information recorded in the defective address memory 169 so as to determine whether or not the pixel is a defective pixel (step S72).

If the position information of the pixel whose sensor output after the sensitivity correction has been obtained from the sensitivity correction circuit 116 is included in the position information recorded in the defective address memory 169, the defect replacement processing circuit 170 determines that the pixel is a defective pixel. The defect replacement processing circuit 170 assumes that the pixel output data of adjacent pixels are close to each other, and replaces the pixel output data of the pixel determined to be a defective pixel with the pixel output data of a normal pixel adjacent to the defective pixel (step S74). Thereby, it is possible to temporarily use the pixel output data of the normal pixel in place of the pixel output data of the defective pixel. The defect replacement processing circuit 170 rewrites the pixel output data that is already stored in the frame memory 152 by the substitute pixel output data (step S78).

On the other hand, if the position information of the pixel whose sensor output after the sensitivity correction has been obtained from the sensitivity correction circuit 116 is not included in the position information recorded in the defective address memory 169, the defect replacement processing circuit 170 does not perform replacement processing (step S76). The defect replacement processing circuit 170 rewrites the pixel output data that has already been stored in the frame memory 152 by the pixel output data indicating the addition result at this time in step S68 (step S78).

In this manner, if the comparator 151 determines that there is a pixel whose sensor output does not match the reference value, the comparator 151 determines that random telegraph noise has occurred in the pixel, and records the position information of the pixel in which random telegraph noise has occurred in the defective address memory 169. At the time of generating an image signal, the defect replacement processing circuit 170 refers to the defective address memory 169. If a defective pixel is detected, the defect replacement processing circuit 170 performs processing for replacing the pixel output data of the defective pixel with the pixel output data of an adjacent normal pixel. This replacement processing reduces the influence of random telegraph noise.

After step S78, the pixel output data in the frame memory 152 is output to the imaging circuit 115.

In FIG. 13, the imaging circuit 115 generates an image signal using the pixel output data stored in the frame memory 152 for each sensor element 124. The pixel output data in the frame memory 152 is 14-bit signal data after correcting the sensitivity of the sensor output from the imaging unit 110.

If the display monitor 153 performs monitor output with grayscale representation having 256 grayscales, the adjustment circuit 162 converts the 14-bit pixel output data into 8-bit pixel output data. The original 14-bit pixel output data has the information corresponding to the entire output range of the infrared image sensor 114. The adjustment circuit 162 does not perform monitor output of the entire output range with black-and-white grayscale representation to the display monitor 153, but cuts out part of the entire output range, and performs monitor output of the cut range with black-and-white display to the display monitor 153. The adjustment circuit 162 adjusts the width of the cutting with a specified point as center of the entire output range in order to generate 8-bit pixel output data.

The adjustment circuit 162 performs level adjustment that determines the median at the time of cutting out, and adjusts the brightness of the entire screen when displaying an imaging result by performing the level adjustment. On the other hand, the adjustment circuit 162 performs gain adjustment that determines the width of the cutting, and adjusts the contrast of the screen display by performing the gain adjustment.

The image signal generation circuit 163 performs format conversion processing that converts the 8-bit image output data generated by the adjustment circuit 162 into a data array in accordance with the display format of the display monitor 153, or the like, and outputs the image signal after having been subjected to the format conversion processing to the display monitor 153.

In FIG. 13 and FIG. 14, the handling of random telegraph noise is realized by updating data in the defective address memory 169. However, the handling method is not limited to this.

For example, rewriting the sensor output after the correction in the frame memory 152 may be controlled using the determination result by the comparator 151 on the monitor output. Specifically, if the monitor output and the reference value do not match, the data in the previous imaging frame may be continued to be used without updating the frame memory 152.

Figure 15:
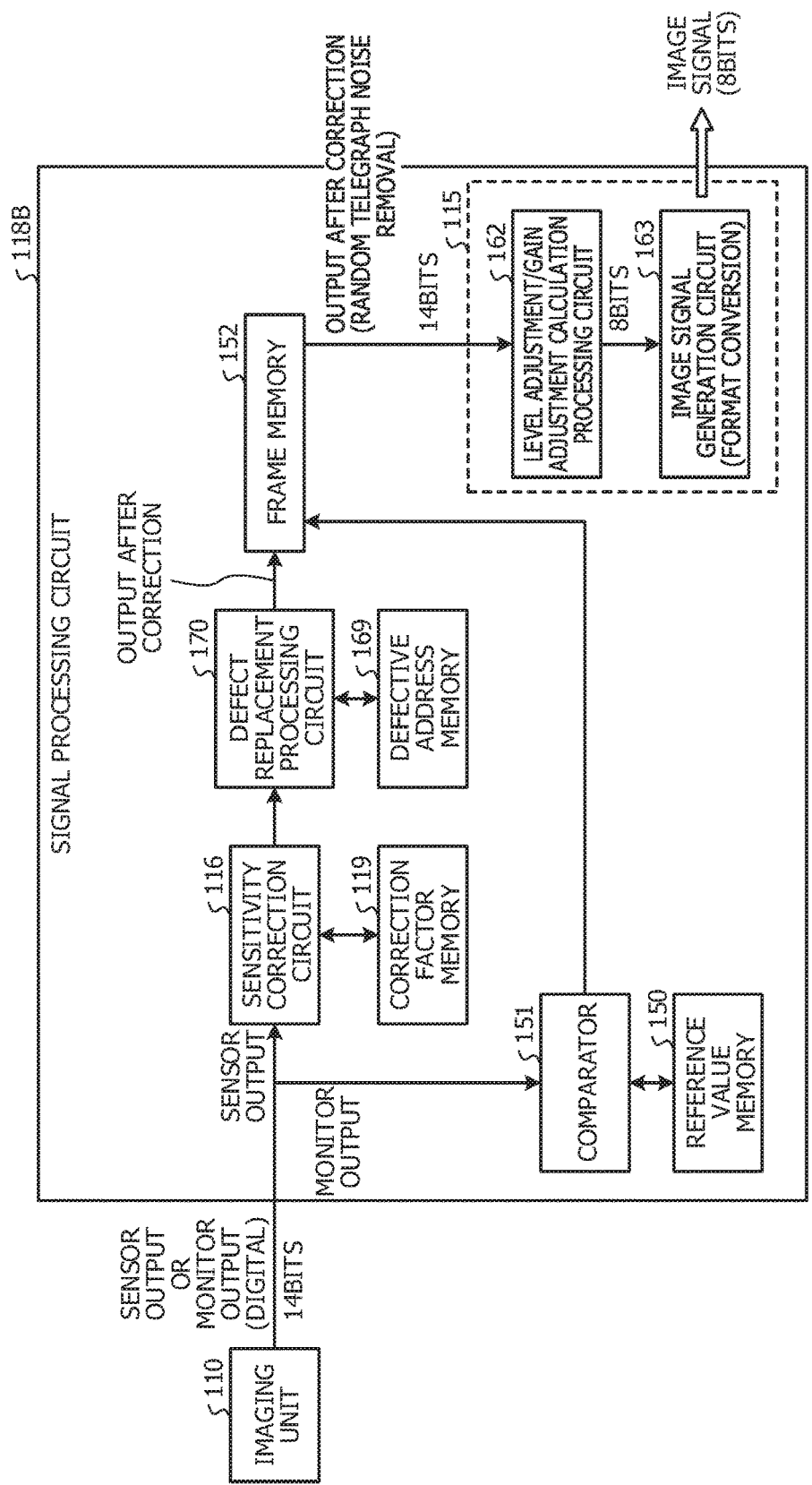
FIG. 15 is a diagram illustrating an example of the configuration of a signal processing unit.

FIG. 15 is a diagram illustrating an example of the configuration of a signal processing circuit 118B. FIG. 16 is a flowchart illustrating an example of the handling procedure of random telegraph noise by the signal processing circuit 118B. The signal processing circuit 118B is the second example of the signal processing circuit 118. For the same configuration as described above, the above-described description will be quoted and thus its description will be omitted. A description will be given of the configuration in FIG. 15 in comparison with each processing step illustrated in FIG. 16.

In step S80, the imaging unit 110 outputs the sensor output of each pixel to the sensitivity correction circuit 116. In step S82, the sensitivity correction circuit 116 corrects the sensitivity of the sensor output of each pixel and outputs the sensor output after the sensitivity correction of each pixel to the defect replacement processing circuit 170.

The defect replacement processing circuit 170 determines whether or not the position information of the pixel whose sensor output after the sensitivity correction is obtained from the sensitivity correction circuit 116 is included in the position information recorded in the defective address memory 169 so as to determine whether or not the pixel is a defective pixel (step S84).

If the position information of the pixel whose sensor output after the sensitivity correction has been obtained from the sensitivity correction circuit 116 is included in the position information recorded in the defective address memory 169, the defect replacement processing circuit 170 determines that the pixel is a defective pixel. The defect replacement processing circuit 170 assumes that the pixel output data of adjacent pixels are close to each other, and replaces the pixel output data of the pixel determined to be a defective pixel with the pixel output data of a normal pixel adjacent to the defective pixel (step S86). Thereby, it is possible to temporarily use the pixel output data of the normal pixel in place of the pixel output data of the defective pixel.

On the other hand, if the position information of the pixel whose sensor output after the sensitivity correction has been obtained from the sensitivity correction circuit 116 is not included in the position information recorded in the defective address memory 169, the defect replacement processing circuit 170 does not perform replacement processing (step S88).

On the other hand, the imaging unit 110 outputs the monitor output of each pixel to the comparator 151. The comparator 151 compares the monitor output and the reference value recorded in the reference value memory 150 for a pixel having the same position with each other and determines whether or not they match each other (step S90). A reference value is, for example, the average value of the monitor outputs in a normal state.

The comparator 151 controls the storage of the data in the frame memory 152, which becomes the original data for generating an image signal based on the comparison result in step S90. If the reference value and the monitor output match, the comparator 151 determines that random telegraph noise has not occurred in the pixel and updates the data in the frame memory 152 to new pixel output data after the sensitivity correction (step S92). On the other hand, if the reference value and the monitor output do not match, the comparator 151 determines that random telegraph noise has occurred and does not update the frame memory 152. Accordingly, for a pixel in which random telegraph noise has occurred, the pixel output data after the sensitivity correction in the previous imaging frame remains.

The pixel output data in the frame memory 152 is output to the imaging circuit 115. The processing for generating an image signal from the pixel output data in the frame memory 152 is the same as described above.

In the above, descriptions have been given of the signal output circuit, the image sensor, and the imaging apparatus by the embodiments. However, the present disclosure is not limited to the embodiment described above. It is possible to make various variations and improvements, such as combination or replacement of a part of or all of the other embodiments within the scope of the present disclosure.

For example, the observation target of the sensor element is not limited to infrared light, and may be the other electromagnetic waves, such as visible light, ultraviolet light, X-ray, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal output circuit comprising:
a transistor includes a source that is coupled to a light receiving element and a gate of which electric potential is fixed;
a first switch circuit coupled to the source of the transistor and capable of fixing a potential of the source to a reference potential;
a second switch circuit coupled to a drain of the transistor;
a third switch circuit coupled to the drain;
a first capacitor coupled to the drain via the second switch circuit and coupled to the drain via the third switch circuit, wherein when the potential of the source is not fixed to the reference potential, a first voltage according to a first current flowing through the transistor via the second switch circuit occurs, and when the potential of the source is fixed to the reference potential, a second voltage according to a second current flowing through the transistor via the third switch circuit occurs; and
an output circuit that outputs a first signal corresponding to the first voltage and a second signal corresponding to the second voltage.

2. The signal output circuit according to claim 1,
wherein the first current and the second current alternately flow through the transistor.

3. The signal output circuit according to claim 1,
wherein the second switch circuit includes a first switch coupled to the drain, a second switch coupled to the first capacitor, and a second capacitor disposed between the first switch and the second switch, and
the second current flows through the transistor in a state in which the first switch and the second switch are turned off.

4. The signal output circuit according to claim 1,
wherein the second switch circuit includes a first switch through which the first current flows, a second capacitor across which a voltage according to the first current occurs, and a second switch that transfers a voltage of the second capacitor to the first capacitor so as to generate the first voltage across the first capacitor, and
the second current flows through the transistor in a state in which the first switch and the second switch are turned off.

5. The signal output circuit according to claim 3,
wherein a capacitance value of the first capacitor is smaller than a capacitance value of the second capacitor.

6. The signal output circuit according to claim 1,
wherein the output circuit outputs the first signal and the second signal from a common output terminal.

7. The signal output circuit according to claim 1,
wherein the light receiving element is a sensor element that changes a resistance value in accordance with an amount of incident electromagnetic wave.

8. The signal output circuit according to claim 7,
wherein the electromagnetic wave is infrared light.

9. The signal output circuit according to claim 1,
wherein the reference potential is a power source potential.

10. The signal output circuit according to claim 1,
wherein the second switch circuit is disposed between the source and a power source.

11. An image sensor comprising:
a plurality of light receiving elements;
a plurality of pixel circuits disposed correspondingly to the light receiving elements; and
an output circuit,
wherein each of the plurality of pixel circuits including:
a transistor having a source coupled to a corresponding one of the light receiving elements, and a fixed gate potential,
a first switch circuit coupled to the source of the transistor and capable of fixing a potential of the source to a reference potential,
a second switch circuit coupled to a drain of the transistor,
a third switch circuit coupled to the drain,
a first capacitor coupled to the drain via the second switch circuit and coupled to the drain via the third switch circuit, wherein when the potential of the source is not fixed to the reference potential, a first voltage according to a first current flowing through the transistor via the second switch circuit occurs, and when the potential of the source is fixed to the reference potential, a second voltage according to a second current flowing through the transistor via the third switch circuit occurs, and
wherein the output circuit outputs a first signal corresponding to the first voltage and a second signal corresponding to the second voltage for each of the pixel circuits.

12. An imaging apparatus comprising:
an imaging circuit; and
a signal processing circuit,
wherein the imaging circuit includes an image sensor and an output circuit,
the image sensor includes a plurality of light receiving elements and a plurality of pixel circuits disposed correspondingly to the light receiving elements,
wherein each of the plurality of pixel circuits includes a transistor having a source coupled to a light receiving element, and a fixed gate potential, a first switch circuit coupled to the source of the transistor and capable of fixing a potential of the source to a reference potential, a second switch circuit coupled to a drain of the transistor, a third switch circuit coupled to the drain, a first capacitor coupled to the drain via the second switch circuit and coupled to the drain via the third switch circuit, wherein when the potential of the source is not fixed to the reference potential, a first voltage according to a first current flowing through the transistor via the second switch circuit occurs, and when the potential of the source is fixed to the reference potential, a second voltage according to a second current flowing through the transistor via the third switch circuit occurs, the output circuit outputs a first output signal corresponding to the first voltage and a second output signal corresponding to the second voltage for each of the pixel circuits, and wherein the signal processing circuit generates an image signal based on the first output signal, and determines whether or not noise has occurred based on a change in the second output signal.

13. The imaging apparatus according to claim 12, wherein the signal processing circuit determines whether or not noise has occurred based on a comparison between the second output signal and a reference value.

14. The imaging apparatus according to claim 12, wherein the signal processing circuit replaces pixel output data of a pixel in which noise has occurred with pixel output data of a normal pixel adjacent to the pixel.

15. The imaging apparatus according to claim 12, wherein the signal processing circuit controls updating of a frame memory using a determination result as to whether or not noise has occurred.

\* \* \* \* \*